United States Patent Office 3,737,327
Patented June 5, 1973

3,737,327
BAKERY ADDITIVE AND METHOD
Bromley M. Mayer, Pasadena, and Ralph J. Trickel, Redondo Beach, Calif., assignors to Knudsen Creamery Co. of California, Los Angeles, Calif.
No Drawing. Filed Mar. 17, 1971, Ser. No. 125,341
Int. Cl. A21d 2/26, 2/34
U.S. Cl. 99—91    13 Claims

ABSTRACT OF THE DISCLOSURE

A bakery additive comprising a mixture of whey proteins with a dried lactose-consuming yeast derived from culturing of the yeast in a cottage cheese whey, cheese whey solids and, optionally, a mixture of edible calcium salts. The weight ratio of the cheese whey solids to the mixture of yeast cells and whey protein may range from 80:20 to 20:80 and the content of calcium salts which may be present is sufficient to improve the strength of a bread dough to which the composition is added and to act as a buffer in keeping the pH within whatever range is desired, such as about 4.8 to about 5.5. The bakery additive is employed in conventional bread doughs at an effective concentration which is sufficient to improve the strength of the bread sidewalls, to increase the bread baked volume, and to improve the texture of the resulting baked product.

---

This invention relates to a bakery additive and to its use in baking bread. More specifically, the invention pertains to the use of a bakery additive which can be used as a replacement for milk solids and which provides bread having improved properties of strength, baked volume and texture.

Milk solids are employed as a component in the preparation of baked products produced from a yeast-fermented dough. Milk solids are expensive and thus their use increases the cost of the baked products. Accordingly, it would be desirable to provide a bakery additive which is cheaper than milk solids and which could partially or completely replace the use of milk solids in a baked product prepared from a yeast-fermented dough.

In accord with our invention we have provided a bakery additive which serves as a replacement for the milk solids previously employed in the preparation of bread from a yeast-fermented dough. Moreover, in the use of our bakery additive, we obtain baked products whose properties are superior to properties of bread, as previously prepared, which contained milk solids. The bread prepared in accord with our invention has strengthened sidewalls, increased baked volume and a finer cell structure. Also, bread prepared in accord with our invention has improved stability such that it does not become stale as quickly as conventional breads.

Our bakery additive is a mixture of several ingredients. The first ingredient (termed Component A), is a mixture of yeast cells and whey protein and is prepared from the growth of yeast in a cottage cheese whey. Cottage cheese whey is obtained as a by-product from the production of cottage cheese. In making cottage cheese, the milk is first separated into cream and skim milk and the skim milk is then pasteurized and pumped into a cheese vat. Within the cheese vat, cheese starter is added and acidity is developed within the skim milk. At the proper time, the coagulated milk, which is in the form of a soft gel, is cut into cubes with cheese knives. The curd is then slowly heated and gently agitated until the whey has been expelled from the curd and the texture of the cheese is considered right by the cheese maker. At this time, the pH of the whey is in the order of about 4 to 5 and has a temperature of at least about 130° F. When the curd has been adequately cooked, the agitation is stopped and the curd is permitted to sink to the bottom of the vat. The whey is then pumped out of the vat into a storage tank through a sieve which holds back the cheese curd.

The acid whey resulting from the cottage cheese manufacture is then heated, e.g., by use of steam injection, to a temperature of about 200° F. or higher for a time sufficient, e.g., about 20 minutes or more, to precipitate the whey proteins and is then cooled to about 90° F. for the subsequent fermentation operation. The cooled whey is then pumped into a fermentor and is inoculated with a yeast cream which contains a lactose-consuming yeast. The preferred lactose-consuming yeast is *Saccharomyces fragilis*. Within the fermentor, oxygen or air is added, nitrogen is added, e.g., in the form of ammonia, and an acid such as sulfuric acid is added to maintain a pH of about 3.0 to 6.0 and preferably about 5.0. The fermentation is continued at a temperature of about 80 to about 110° F. for about six hours and during the fermentation, cooling is provided to remove the heat generated by the fermentation process.

Other ingredients which may be present during the fermentation are conventional, such as the use of a growth additive for the yeast, e.g., corn steep liquor, or the use of antifoaming agents. Examples of antifoaming agents are silicones and polyoxyethylene polymers.

When the sugar within the whey has been substantially consumed by the yeast, the fermentation is terminated. A convenient method for determining the absence of sugar involves the use of Clinitest reagent tablets manufactured by Ames Co., a division of Miles Laboratories. These may be added to a small portion of the fermentation medium. In the absence of sugar, the addition of the tablets produces a deep blue color. If a color other than blue is produced, sugar is still present in the fermentation medium and the fermentation is then continued until a subsequent test produces the blue color indicative of the absence of sugar.

When the fermentation procedure has been completed, the yeast cells are then harvested from the fermentation beer. This may be accomplished by passing the fermentation beer through a continuous yeast separator, i.e., a centrifuge. An example of a suitable yeast separator is a Westfalia Yeast Separator, Model HFG–12036 as supplied by Centrico, Inc. Within the yeast separator, the yeast cells and whey protein are spun out of the whey in the form of a cream which may then be washed with about three parts by weight of water for each part of cream and recentrifuged by passage through the continuous yeast separator. The re-centrifuged cream may then be dried in any convenient manner such as by using a roller drier or a spray dried. The drying procedure is conventional and is the same as that previously used in preparing dried milk solids. The resulting mixture (Component A) contains yeast cells in admixture with whey protein.

Cottage cheese whey, as employed in the above described fermentation, typically has a pH of about 4.6, and contains about 63.6% of lactose, 11.6% of ash and 13.3% by weight of protein. The resulting mixture of yeast cells and whey protein (Component A) typically contains 58–60% of protein, 1–2% of fat, 8–10% of ash and 22–26% of carbohydrates. The lactose content of the resulting mixture is essentially nil, as the result of the fermentation. The mixture of yeast cells and whey proteins also contains a wide variety of amino acids and B vitamins. Typically, the content of B vitamins and milk minerals in micrograms per gram is as follows: folic acid, 2 micrograms/gram (mcg./gm.); thiamine, 14 mcg./gm.; niacin, 112 mcg./gm.; riboflavin, 66 mcg./gm.; phosphorus, 1.4% and calcium, 0.4%.

Typically, the percent of amino acids in the protein is as follows: arginine, 5.2; cystine, 1.1; glutamic acid, 18.0; histidine, 2.6; lysine, 9.4; methionine, 1.7; isoleucine, 5.9;

leucine, 10.6; phenylalanine, 4.2; threonine, 5.9; tryptophane, 1.6; valine, 7.1; tyrosine, 3.5 and serine, 4.4.

The mixture of yeast cells and whey solids in Component A, as described above, differs substantially from conventional sources of protein such as brewer's yeast and torula yeast. This can be demonstrated by the high Protein Efficiency Ratio (PER) of Component A. The PER is defined as the weight gain in grams per gram of protein intake of laboratory rats fed on the material. The PER of Component A is significantly higher than the PER value for conventional dried yeasts. The test used to determine PER is a standard test and is described at page 680 of the Official Methods of Analysis of the Association of Official Agricultural Chemists (ninth edition, 1960).

As stated previously, the second ingredient, Component B, in our bakery additive composition, is dry cheese whey solids. Cheese whey solids may be obtained from the whey resulting from the manufacture of cheese, such as cheddar and Swiss cheese. The content of one type of cheese whey, i.e., sweet whey solids, is illustrated by the Standards for Dry Whey U.S. Grade, as set forth at 19 Federal Regulations, 3349. As there described, dry whey may result from the spray-drying of sweet, fresh cheese whey which has been pasteurized, either before or during the process of manufacture, at a temperature of 143° for 30 minutes or its equivalent, and to which no alkali or other chemical has been added. Sweet whey solids have a uniform light color, are free from lumps that do not break up under moderate pressure and are practically free from brown and black scorched particles. The moisture content of sweet whey solids is not more than 5.00%, the butterfat content is not more than 1.25% and the titratable acidity is not more than 0.16%.

Sweet whey solids, which is one form of cheese whey solids, is preferred for use as Component B in our bakery additive. However, as stated above, cheese whey solids which do not meet the requirements for sweet whey solids may be employed as Component B. The term "cheese whey" also includes neutralized acid whey in which an acidic whey, such as cottage cheese whey, is essentially neutralized by reaction with a base, such as calcium hydroxide or sodium hydroxide.

As stated previously, the weight ratio of Component A to Component B in our composition ranges from about 20:80 to about 80:20, and is preferably about 50 to 50. Components A and B can be admixed in any suitable manner, such as, for example, by dry blending.

Additionally, there may be present in our composition one or more calcium salts, either alone or in admixture with certain ammonium salts. Suitable calcium salts are calcium lactate, calcium phosphate and calcium sulfate, and suitable ammonium salts are ammonium chloride, ammonium sulfate and ammonium phosphate. At least a portion of the salt which may be present is a calcium salt. Ammonium salts, if present, are preferably used in combination with calcium sulfate.

It has been found that the presence of one or more of the above salts functions to make the bread dough firmer or stronger in the use of our bakery additive. The salt also acts as a buffer to keep the pH within whatever value is desired by the baker, such as about 4.8 to about 5.5. Typically, the calcium or ammonium salts may be present in our bakery additive in a content ranging from about 0.25% to about 20.0% by weight.

A preferable salt mixture for use in our bakery additive is a mixture of calcium lactate and calcium phosphate at a weight ratio of about 2 parts of monocalciumphosphate for each part of calcium lactate. Still other preferred salt mixtures are a mixture of calcium sulfate and monocalcium phosphate. In using a mixture of calcium sulfate with monocalciumphosphate, we have employed weight ratios of the materials ranging from about 60:40 to about 40:60 and preferably about 1:1.

In usage, our bakery additive is added to a yeast fermented dough at a concentration which is sufficient to strengthen the sidewalls of the resulting bread, to increase its baked volume and to produce a finer cell structure in the resulting bread. In general, we have found that the use of our additive at a concentration of about ½% to about 3% by weight of the flour produces bread having superior properties.

In using our bakery additive the bread is baked in a conventional manner. All that is required is that our bakery additive be added to the ingredients forming the bread dough. Our bakery additive may be added in a dry form to the dough ingredients or may be added in the form of a slurry in admixture with water.

To further demonstrate our invention, the following examples are presented in which all parts and percentages are by weight unless otherwise indicated.

EXAMPLE I

To 100 parts of a standard bread flour having a protein content of 12.4%, an ash content of 0.41% and an amylograph level of 750–800 was added 64.5 parts of water, 2 parts of salt, 5 parts of sugar, 0.38 parts of a yeast food supplement, 2.5 parts of yeast and 4 parts of a standard whey, as described previously with reference to the Standards for whey. The ingredients were blended at a low speed in a dough mixer for 1½ minutes and were then blended at a high speed for 3½ minutes. The resulting dough was then placed in a fermentor maintained at a temperature of about 95 to 100° F. After resting in the fermentor for 70 minutes, the dough was punched out to expel gases and permitted to remain in the fermentor for an additional 8 minutes. Following this, the dough was formed into balls and placed in pans and permitted to rest for an additional 12 minutes at a temperature of about 85 to about 100° F. The dough was then sheeted out by rolling first in one direction and then in another direction, at approximately right angles to the first direction, and formed into loaves which were placed into pans. The loaves were then proofed for 62 minutes at a temperature of about 100° F. and a relative humidity of about 100%. Following this the pans were placed in a baking oven and baked for about 25 minutes at a standard baking temperature of about 425° F.

The bread loaf was then evaluated from the standpoint of its external appearance, its internal appearance and its flavor. The volume of the loaf was 2400 ccs. for a standard one-pound loaf, which was unsatisfactory. Its external crust appearance was streaky and it had a bad color. The bread had weak sidewalls and its symmetry was unsatisfactory. The symmetry of the loaf was determined visually. In a loaf having good symmetry, the sidewalls are straight, there is an even break and shred and the top is uniformly curved. The loaf of the present example lacked these characteristics.

The loaf was then cut and its internal texture was found to be fair. However, the color of the bread was unsatisfactory and is flavor was only fair. On an overall scoring basis, the loaf was rated at 70% based on a possible total of 100%.

EXAMPLE II

The procedure described in Example I was repeated, utilizing in place of the standard whey a mixture comprising one-third of Component A, as described previously, with two-thirds of Component B. After mixing the dough ingredients in the manner described in Example I, the dough was placed in the fermentor and allowed to rest for 70 minutes before being punched out. It then remained in the fermentor for an additional 8 minutes. Following this, the dough was formed into balls and permitted to rest for an additional 12 minutes. The dough, after being sheeted out and formed into loaves, was proofed for 62 minutes and baked for 25 minutes at a temperature of about 425° F.

The loaf had a baked volume of 2500 cubic centimeters for a standard one-pound loaf and had an overall rating of 90% based on a possible 100%. The loaf had a good external crust appearance and had fair symmetry. The sidewalls of the bread were excellent and its internal texture was good. The bread had a very good color and a good flavor.

EXAMPLE III

The procedure of Example I was again repeated, using in lieu of the whey solids a mixture comprising one-third sweet whey solids (Component B) and two-thirds of Component A, as described previously. After mixing the dough ingredients in the manner described in Example I, the dough was placed in the fermentor for 68 minutes and then punched out. Following this, the dough was permitted to remain in the fermentor for an additional 8 minutes and was then formed into balls. The balls were permitted to rest in pans for 12 minutes and were then sheeted out and formed into loaves and proofed for 58 minutes. The loaves were then baked for 25 minutes at a baking temperature of about 425° F.

The loaves were then rated in the manner described previously and had an overall rating of 95% out of a possible 100%. The loaves had a good baked volume and in successive tests, the baked volume of a standard one-pound loaf was found to be 2550 cubic centimeters in one case and 2600 cubic centimeters in another. The bread had an excellent external crust appearance and had good external symmetry with strong, straight sidewalls and good break and shred and uniformly curved top. The internal texture of the bread was rated fair and its color and flavor were good.

In a number of other experiments, our bakery additive containing one or more edible salts, as defined above, was added to a yeast fermented dough which was then baked. In these experiments, baked volumes in excess of 3,000 cubic centimeters were obtained for a one-pound loaf. Also, it was found that breads containing our bakery additive were more easily sliced on a slicing machine due to their fine and more uniform cell structure and that the bread doughs containing our bakery additive were capable of absorbing larger amounts of water in producing a superior baked product. The ability of the dough to absorb increased amounts of water is of considerable importance since it results in decreasing the cost of the ingredients used in preparing the bread. As demonstrated by these experiments, bread which contained our bakery additive also had less shrinkage when toasted. Various concentrations of edible salts as described previously, were used in these tests, ranging from as low as about 0.5% to as high as about 20% by weight of the bakery additive composition.

We claim:

1. A bakery additive suitable for the replacement of milk solid in bread and like yeast fermented dough products, consisting essentially of
   (a) Component A, and
   (b) Component B which is dry cheese whey solids in a weight ratio of said Component A to said Component B from about 80:20 to about 20:80, where said Component A is a mixture of lactose-consuming yeast and cottage cheese whey proteins which proteins are obtained by heat treatment of cottage cheese whey, which mixture is obtained by lactose-consuming yeast fermentation of said heat treated whey, including said proteins as precipitated solids, until substantially all the sugar in said heat treated whey has been consumed by said yeast; then separating the yeast and said whey proteins present in said fermentation product from the liquid portion of said fermentation product; and drying said mixture of yeast and proteins.

2. The bakery additive of claim 1 wherein the weight ratio of Component A to Component B is about 50:50.

3. The bakery additive of claim 1 wherein Component B is composed of sweet whey solids.

4. The bakery additive of claim 1 wherein Component B is composed of a neutralized acid whey.

5. The bakery additive of claim 1 containing calcium lactate, calcium phosphate, calcium sulfate or mixtures thereof at a concentration of about 0.5 to about 20 percent by weight.

6. The bakery additive of claim 5 containing ammonium chloride, ammonium sulfate, ammonium phosphate or mixtures thereof, where the total amount of calcium and ammonium salt is about 0.5 to about 20 percent by weight.

7. The bakery additive of claim 5 containing calcium lactate and monocalciumphosphate at a weight ratio of about 2 parts of monocalciumphosphate for each part of calcium lactate.

8. The bakery additive of claim 5 containing calcium sulfate and monocalciumphosphate at a weight ratio of about 60:40 to about 40:60.

9. The bakery additive of claim 1 wherein said yeast is *Saccharomyces fragilis*.

10. In the method of preparing a bread product from a yeast-fermented bread dough, containing milk solids, by baking said dough in the form of loaves placed in bread pans, the improvement which consists essentially of replacing some or all of said milk solids with an amount of the bakery additive defined in claim 1 sufficient to increase the strength of the bread sidewalls, to increase the baked volume of the bread, to give the bread a finer cell structure, and to give the bread increased resistance to becoming stale.

11. The method of claim 10 wherein said bakery additive is present in an amount of about one-half to three percent by weight of the flour present in said bread dough.

12. The method of claim 10 wherein said bakery additive contains calcium lactate, calcium phosphate, calcium sulfate or mixtures thereof at a concentration of about 0.5 to about 20 percent by weight.

13. The method of claim 12 wherein said bakery additive also contains ammonium chloride, ammonium sulfate, ammonium phosphate or mixtures thereof, and the total amount of calcium and ammonium salt does not exceed about 20 percent by weight.

References Cited

UNITED STATES PATENTS

| | | | |
|---|---|---|---|
| 2,555,514 | 6/1951 | Sharp et al. | 99—91 X |
| 3,061,442 | 10/1962 | Ward et al. | 99—91 |
| 3,445,238 | 5/1969 | Eggen et al. | 99—91 |

RAYMOND N. JONES, Primary Examiner

J. R. HOFFMAN, Assistant Examiner

U.S. Cl. X.R.

99—57